US011942719B2

(12) United States Patent
Burrow et al.

(10) Patent No.: US 11,942,719 B2
(45) Date of Patent: Mar. 26, 2024

(54) SUBSEA CONNECTOR

(71) Applicant: Siemens Energy Global GmbH & Co. KG, Munich (DE)

(72) Inventors: Christopher Burrow, Ulverston (GB); Kelly Turner, Dalton-In-Furness (GB); Daniel Walton, Carnforth (GB)

(73) Assignee: Siemens Energy Global GmbH & Co. KG, Munich (DE)

( * ) Notice: Subject to any disclaimer, the term of this patent is extended or adjusted under 35 U.S.C. 154(b) by 129 days.

(21) Appl. No.: 17/694,778

(22) Filed: Mar. 15, 2022

(65) Prior Publication Data

US 2022/0302633 A1 Sep. 22, 2022

(30) Foreign Application Priority Data

Mar. 17, 2021 (GB) ...................................... 2103663
Mar. 17, 2021 (GB) ...................................... 2103664
Mar. 17, 2021 (GB) ...................................... 2103666
Mar. 17, 2021 (GB) ...................................... 2103667
(Continued)

(51) Int. Cl.
*H01R 13/523* (2006.01)
*H01R 13/24* (2006.01)
(Continued)

(52) U.S. Cl.
CPC ....... *H01R 13/523* (2013.01); *H01R 13/2421* (2013.01); *H01R 13/2471* (2013.01); *H01R 13/502* (2013.01); *H01R 13/5202* (2013.01); *H01R 13/5219* (2013.01); *H01R 13/5227* (2013.01); *H01R 13/533* (2013.01);
(Continued)

(58) Field of Classification Search
None
See application file for complete search history.

(56) References Cited

U.S. PATENT DOCUMENTS 3,665,368 A 5/1972 Ellis
3,742,427 A 6/1973 Ballard
(Continued)

FOREIGN PATENT DOCUMENTS

CN 111384633 A * 7/2020 ............. H01R 13/52
EP 3396784 B1 * 12/2020 ........... H01R 13/523
(Continued)

*Primary Examiner* — Tho D Ta
(74) *Attorney, Agent, or Firm* — Wolter Van Dyke Davis, PLLC

(57) ABSTRACT

An ROV, diver, or stab, wet mateable connector plug front end housing includes a housing front section; a locator mount section; and a seal section axially in series with one another. The housing front section includes a plug coarse alignment feature on an outer surface of the housing front section, adjacent to a front surface of the housing front section and radially outward of a central axis of the housing. There is a circumferential groove on the outer surface of the housing front section, axially displaced from and rearward of the coarse alignment feature, the groove being adapted to receive a latch of a wet-mateable connector receptacle front end housing. The plug coarse alignment feature includes a bullnose feature. A plug fine alignment feature is formed in the outer surface of the housing front section, aligned with and located radially outward of the central axis of the housing.

11 Claims, 6 Drawing Sheets

(30) Foreign Application Priority Data

| | | | |
|---|---|---|---|
| Mar. 17, 2021 | (GB) | ...................................... | 2103668 |
| Mar. 17, 2021 | (GB) | ...................................... | 2103669 |

(51) Int. Cl.

| | |
|---|---|
| ***H01R 13/502*** | (2006.01) |
| ***H01R 13/52*** | (2006.01) |
| ***H01R 13/533*** | (2006.01) |
| ***H01R 13/627*** | (2006.01) |
| ***H01R 13/629*** | (2006.01) |
| ***H01R 24/86*** | (2011.01) |
| *H01R 13/622* | (2006.01) |
| *H01R 13/66* | (2006.01) |

(52) U.S. Cl.
CPC ....... *H01R 13/6271* (2013.01); *H01R 13/629* (2013.01); *H01R 13/62961* (2013.01); *H01R 24/86* (2013.01); *H01R 13/622* (2013.01); *H01R 13/6675* (2013.01); *H01R 2201/04* (2013.01); *H01R 2201/26* (2013.01)

(56) References Cited

U.S. PATENT DOCUMENTS

| | | | | |
|---|---|---|---|---|
| 4,142,770 | A | 3/1979 | Butler, Jr. et al. | |
| 6,464,405 | B2 | 10/2002 | Cairns et al. | |
| 7,341,457 | B2 * | 3/2008 | Lagathu ............. | H01R 13/6335 439/8 |
| 10,014,678 | B2 | 7/2018 | Barrett et al. | |
| 10,704,353 | B2 | 7/2020 | Painter et al. | |
| 2007/0259568 | A1 | 11/2007 | Mackillop et al. | |

FOREIGN PATENT DOCUMENTS

| | | | |
|---|---|---|---|
| FR | 2895577 | A1 | 6/2007 |
| GB | 2338119 | A | 12/1999 |
| WO | 2021037949 | A1 | 3/2021 |

* cited by examiner

SUBSEA CONNECTOR

CROSS REFERENCE TO RELATED APPLICATIONS

This application claims the benefit of United Kingdom Application Nos. GB 2103663.7, GB 2103664.5, GB 2103666.0, GB 2103667.8, GB 2103668.6, GB 2103669.4 all filed on 17 Mar. 2021, and all incorporated by reference herein in their entirety.

FIELD OF INVENTION

This invention relates to a subsea, or underwater, connector.

BACKGROUND OF INVENTION

Subsea, or underwater, connectors are designed to operate beneath the surface of the water. Typically, a subsea connector comprises two parts, generally known as plug and receptacle. The receptacle may include one or more conductor pins and the plug may include corresponding plug sockets for the receptacle conductor pins. The connection may be made topside (dry-mate), or subsea (wet-mate) and the specific design is adapted according to whether the connector is a wet-mate or dry-mate connector. Subsea connectors have various applications including power connectors which supply power to subsea equipment, or control and instrumentation connectors which exchange data between different pieces of subsea equipment, or between subsea equipment and topside devices.

SUMMARY OF INVENTION

In accordance with a first aspect of the present invention, an ROV, diver, or stab, wet mateable connector plug front end housing, the housing comprising a housing front section; a locator mount section; and a seal section axially in series with one another; wherein the housing front section comprises a plug coarse alignment feature on an outer surface of the housing front section, adjacent to a front surface of the housing front section and radially outward of a central axis of the housing; a circumferential groove on the outer surface of the housing front section, axially displaced from and rearward of the coarse alignment feature; wherein the plug coarse alignment feature comprises a bullnose feature; wherein the groove is adapted to receive a latch of an ROV or diver wet-mateable connector receptacle front end housing; and wherein a plug fine alignment feature is formed in the outer surface of the housing front section, aligned with and located radially outward of the central axis of the housing.

The plug front end housing is suitable for any of the ROV, diver or stab wet mateable connectors, with a groove adapted to receive a latch when the front end housing is used for an ROV wet mateable connector, and optionally when used for a diver wet mateable connector, although not for a stab wet mateable connector. However, by standardising features such as the groove, which is there for all the connector types, just not functioning for some, then manufacturing and supply is simplified and overall costs reduced.

The bullnose feature may comprise a series of three truncated cones, the first and third of the cones comprising substantially congruent faces, the first and second cones being joined at their maximum diameter and the second and third cones being joined at their minimum diameter.

The plug fine alignment features may comprise a longitudinal groove forming a keyway.

The plug housing front section may comprise one or more fluid outlets, toward the rear end of the housing front section.

In accordance with a second aspect of the present invention, an ROV, diver, or stab, wet mateable connector receptacle front end housing comprises a housing front section; a locator mount section; and a seal section axially in series with one another; wherein the housing front section comprises a receptacle coarse alignment feature on an inner surface of the housing front section, adjacent to a front surface of the housing front section and radially outward of a central axis of the housing; wherein the receptacle coarse alignment feature comprises a lead in chamfer; the housing further comprising a latch for an ROV or diver wet matable connector, on the inner surface of the housing front section, axially displaced from and rearward of the coarse alignment feature, the latch being adapted to cooperate with a groove of an ROV or diver wet-mateable connector plug front end housing; and a receptacle fine alignment feature formed in the outer surface of the housing front section.

The receptacle fine alignment feature may comprise a through hole.

The receptacle fine alignment feature may further comprise a key mounted in the through hole.

The seal section may comprise one or more barrel seals.

The mounting section may comprise one or more holes, for example through holes, or blind holes, adapted to receive fasteners.

The holes may comprise threaded or smooth inner surfaces.

The fasteners may comprise screws, bolts or pins and the inner surface is adapted accordingly.

The receptacle housing front section may comprise one or more fluid outlets, toward the rear end of the housing front section.

In accordance with a third aspect of the present invention, a wet mateable connector comprises a plug part and a receptacle part; the plug part comprising a plug front end housing according to any preceding claim; a plug front end body comprising electrical pins; a connector plug mount and a connector plug back end housing; the receptacle part comprising a receptacle front end housing according to any preceding claim, a receptacle front end body comprising electrical contacts; a connector receptacle mount and a connector receptacle back end housing.

BRIEF DESCRIPTION OF THE DRAWINGS

An example of a subsea connector and associated method in accordance with the present invention will now be described with reference to the accompanying drawings in which.

DETAILED DESCRIPTION OF INVENTION

The drive to reduce overall lifecycle costs, both capital expenditure (CAPEX) and operational expenditure (OPEX), associated with new deep-water oil and gas developments means that improvements to existing designs, manufacturing processes and operation are desirable. Subsea connector systems are desired that have a lower cost, can be relatively quickly and easily installed and that have reduced maintenance requirements, or need for intervention which affects the systems to which they are connected throughout their working life. Thus, connectors which continue to perform without degradation, over a longer period of time, are desirable.

Typically, connectors for different applications may be single or multi-way connectors. For example, a 4-way connector may be used for delivering power, or a 12-way connector for data transfer via a suitable subsea instrumentation interface standard. This may be level 1, for analogue devices, level 2 for digital serial devices, e.g CANopen, or level 3. using Ethernet TCP/IP. Other data connectors, include optical fibre connectors. Wet mateable controls connectors typically have large numbers of thin conductor pins, in order that multiple control signals to different parts of a product can be included in a single control cable. For example, multiple subsea sensors on different pieces of equipment, such as flow sensors, temperature sensors, or pressure sensors each need to have a separate communication path, so that they can be interrogated, monitored and if necessary actuators can be energised, for example to open or close a valve, or to start or stop a pump. Power transmission may be required for the purpose of supplying power to subsea equipment to enable it to operate, for example to close a valve, or drive a pump. Wet mateable power connectors may have a single pin and socket arrangement, or may be multi-way connectors, but typically with fewer, larger, pins than a control or communications connector.

In a subsea wetmate connector comprising a plug and a receptacle in which the receptacle is mounted to already installed equipment or cable, the mating is typically carried out by an ROV or diver, subsea, bringing the plug into contact with the receptacle. With many connector options, such as ROV, diver, or stab wet mateable connectors, each with variations in the bodywork design and interfaces for ancillary components, it is not possible to build to a connector level without knowing the customer's full requirements. If a customer requirement changes, such as the connector type changing, this may result in a rebuild as it may not be possible to configure a fixed ROV connector into a Stab plate connector, for example. With the restrictions imposed by such a design, alterations can be costly and impact delivery schedules as well as product costs.

Figure 1A:
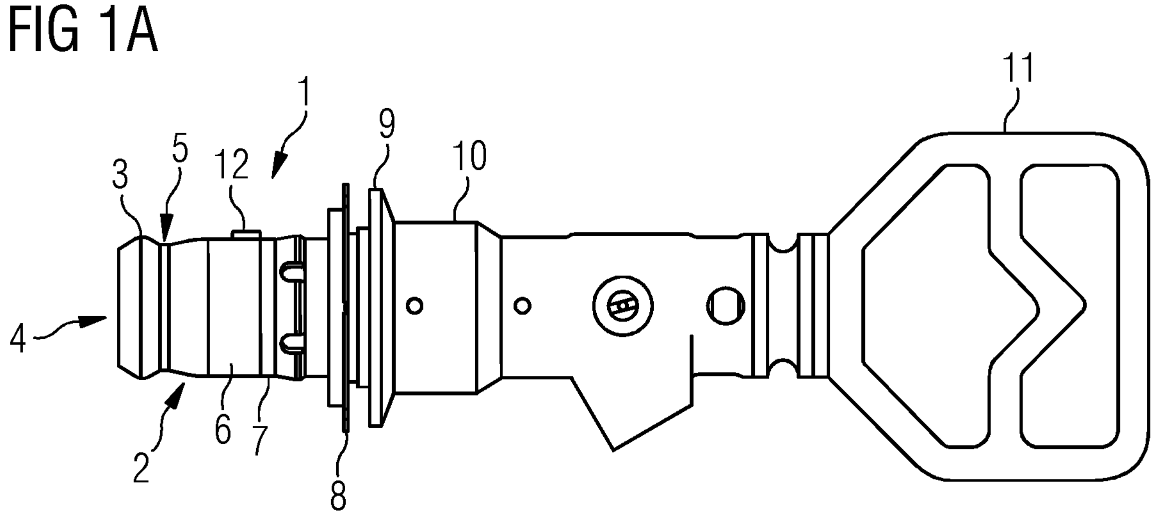
FIG. 1*a* illustrates an example of a plug suitable for an ROV mate.

Conventionally, as illustrated in FIGS. 1*a*, 1*b*, 2*a*, 2*b*, 3*a*, 3*b*, there are three main types of wet mate system, ROV mates, stab mates, or diver mates. As can be seen in FIG. 1*a*, a wet mate connector plug 1, in this example, an ROV flying plug, comprises a plug body 2 having a shaped front end, or bullnose, in this example, effectively a pair of back to back truncated cones and a third cone in series. The largest diameters of the two truncated cones of the pair are adjacent to one another forming a bullnose surface 3, with a smooth transition across the join. The smallest diameter of one cone defines a front surface 4 of the front end of the plug and the smallest diameter of the other cone defines one side of a radial groove 5 or notch in the body, the other side of which is defined by the third cone, the smallest diameter of the third cone being adjacent to the smallest diameter of the other cone which defines the groove 5. Rearward of the groove, the diameter expands, so that a rear end 6 of the plug body has a substantially uniform circumference. Toward the rear of the plug body rear end 6, a snap ring 7 is mounted on the plug body. Behind that a latch indicator 8 is mounted and a front plate 9, with adjacent backshell 10, closer to the handle 11.

Figure 1B:
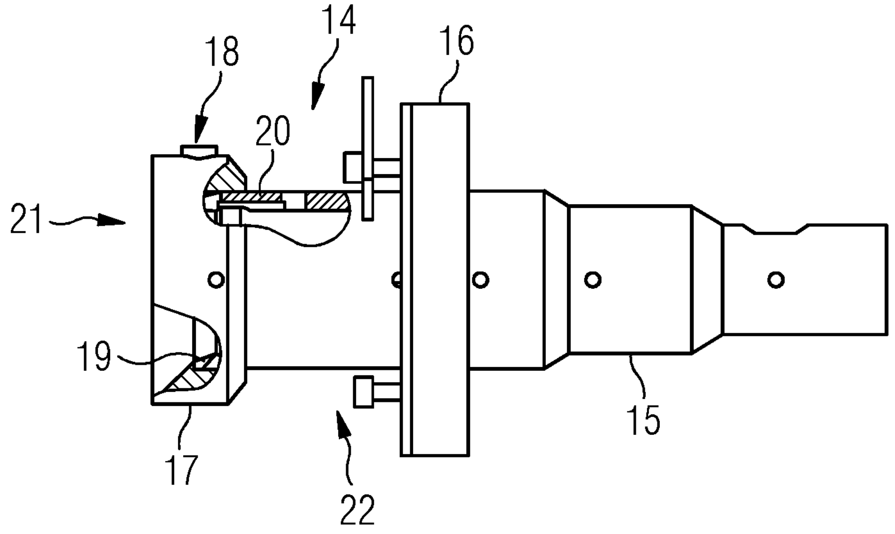
FIG. 1*b* illustrates an example of a receptacle suitable for an ROV mate.

FIG. 1*b* shows the corresponding receptacle 14, typically already installed subsea, with a backshell 15 within the subsea equipment (not shown) and a mounting flange 16 to mount the receptacle to the equipment. An ROV capture cone or shroud 17 provided with an orientation indicator 18 guides the plug into the receptacle, over a lead-in chamfer 19 on an inner surface of the receptacle front end 21. The receptacle rear end 22 is held in the mounting flange 16. As can be seen from the cutaway section of FIG. 1*b*, a keyway 20 is provided in an inner surface of the receptacle front end 21, aligned with the orientation indicator 18, to receive a key 12 formed on an outer surface of the plug body rear end 6. The capture shroud 17, bullnose surface 3 and lead-in chamfer provide coarse alignment. The key 12 and keyway 20 provide fine alignment.

Figure 2A:
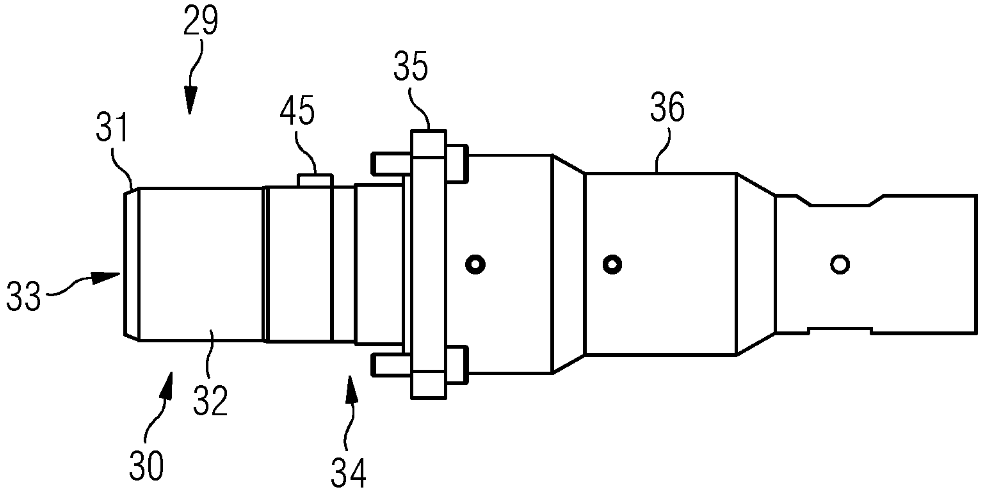
FIG. 2*a* illustrates an example of a plug suitable for a stab mate.
Figure 2B:
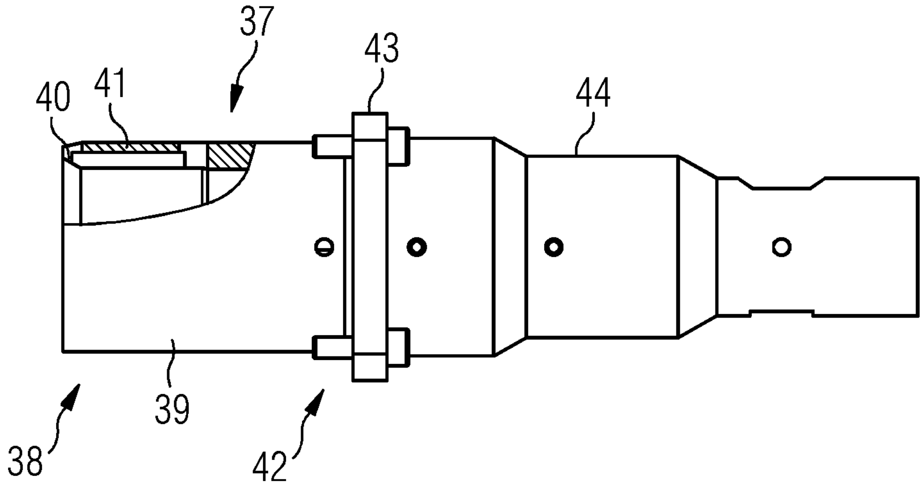
FIG. 2*b* illustrates an example of a receptacle suitable for a stab mate'

FIG. 2*a* illustrates an example of a stab mate plug 29. In the stab mate example, a front end 30 of a plug body 32 comprises a lead in chamfer 31 from a front face 33 of the plug. The plug body 32 has a substantially constant diameter along most of its length. At a rear end 34 of the plug body 32, a mounting flange 35 is provided, to fit the plug to a stab plate (not shown). Behind the mounting flange is a backshell 36 of the plug. The corresponding receptacle 37 is shown in FIG. 2*b*. At a front end 38 of the receptacle body 39, on an inside surface of the receptacle, a lead-in chamfer 40 is provided, to guide the plug front end 30 and behind that chamfer, a keyway 41 is formed into to receive a key 45 which is formed on the plug body 32.

Figure 3A:
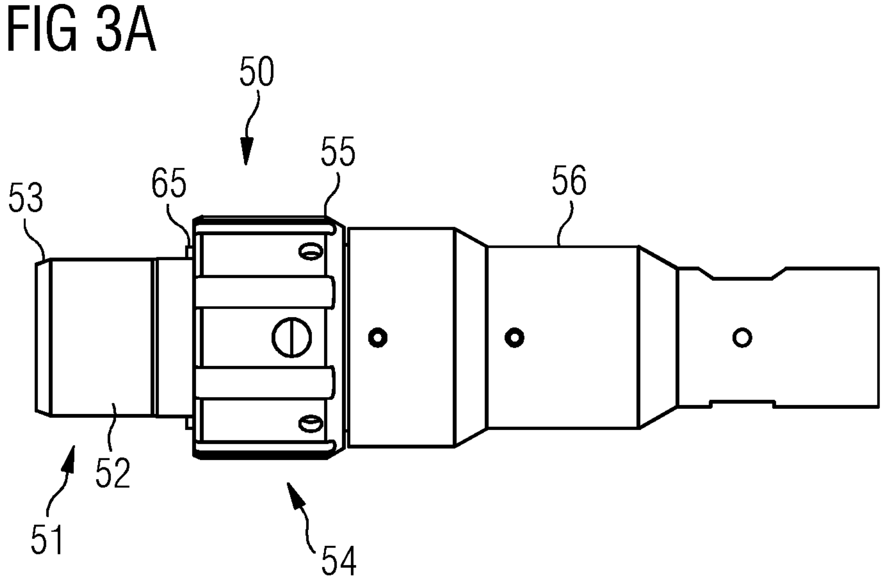
FIG. 3*a* illustrates an example of a plug suitable for a diver mate.
Figure 3B:
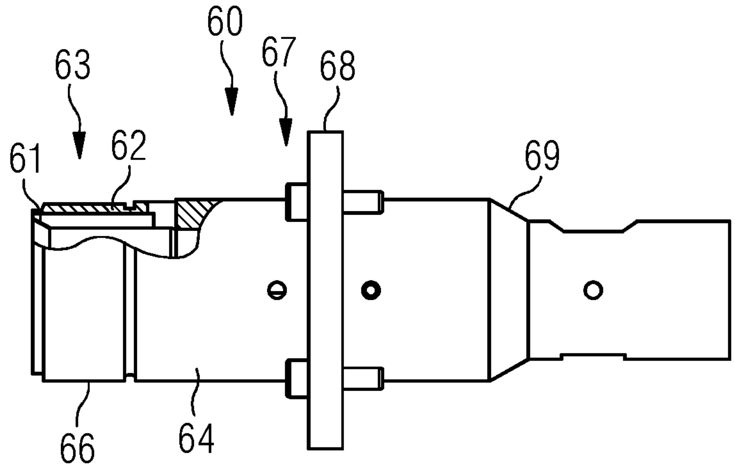
FIG. 3*b* illustrates an example of a receptacle suitable for a diver mate'

FIG. 3*a* shows an example of diver mate plug 50. At a front end 51 of a plug body 52, a lead-in chamfer is provided. The diameter of the plug body is otherwise substantially uniform along its length. At a rear end 54 of the plug body 52, a locking mechanism 55 is mounted. Behind the locking mechanism, a backshell 56 is provided. In a diver mate receptacle 60, a lead-in chamfer 61 is provided and a keyway 62 formed, in an inner surface at a front end 63 of the receptacle body 64. During mating, a key 65 formed on and protruding from the plug surface cooperates with the keyway 62 for fine alignment. A mounting plate 68 is provided on a rear end of the receptacle body 64 and behind that a receptacle backshell 69. A locking mechanism 66 on the receptacle 60 cooperates with the locking mechanism 55 on the plug to lock the plug and receptacle together when mated.

Cost pressures on suppliers of subsea connector systems to produce connectors which deliver the same, or better, operational capabilities, at a reduced cost for each product, have largely been addressed to date, by finding a balance between maintaining enough stock to fulfil orders, without overstocking which can result in a large number of components requiring rework if necessary changes are made to a part design. With many variants of connectors available, and with multiple mating methods, for example, the ROV, diver and stab types described above, overheads are kept to a minimum by keeping stock levels relatively low for connector bodies and ancillary components, but as a result, it is difficult to reduce the manufacturing cost per part, as few are made in each batch. As described above, each type of wet mate connector, ROV, stab and diver, has a different body and different parts on those bodies. For example, a latch indicator 8 is provided on an ROV body 6, so that the completeness of the mate can be checked remotely. However, a latch is not needed on a stab plate, as this type of mate cannot be only partially mated because the connectors are positioned on the Stab plate at the correct height so that when the plates are mated, the connectors mate fully. With a diver mate, the plug body has a threaded ring to lock to the receptacle because for a 12 way variant, the accumulative spring force makes it more difficult to mate by hand in the manner that an ROV would. It is also important to control a demate, so that the diver is not injured during the operation. The threaded ring makes the mate easier as well as controlling the demate. ROV and stab mates do not need the threaded ring because ROVs are able to mate with greater force, and there is no risk to personnel during a demate. STAB mate and demate is controlled by the coming together of the plates. The plates are fixed together, and subsequently the connectors cannot move until the plates are parted. The consequence of all these different variants in the components that make up each type of mate body is that it is costly to have all the components in stock, to cover all the options.

Figure 4A:
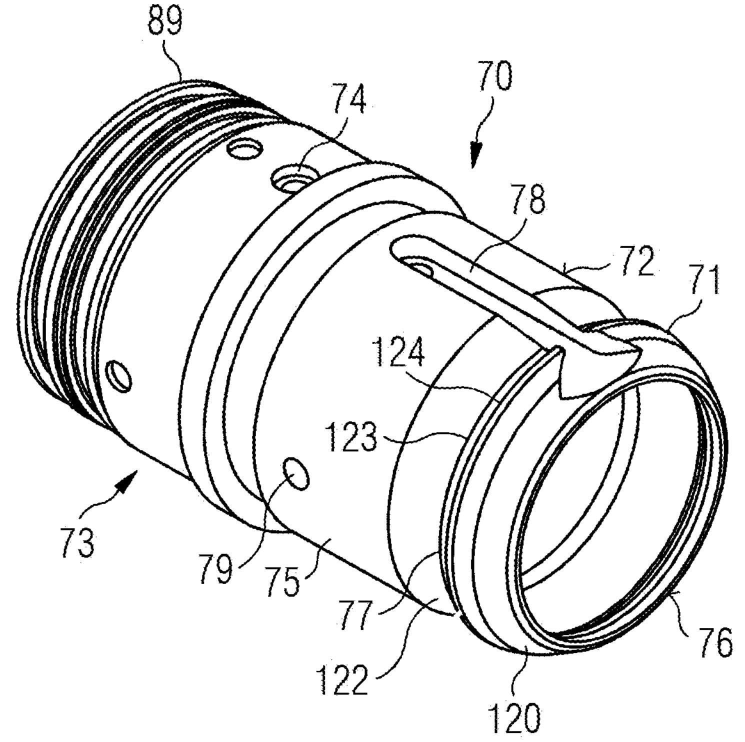
FIG. 4*a* illustrates a universal interface plug according to the present invention.
Figure 4B:
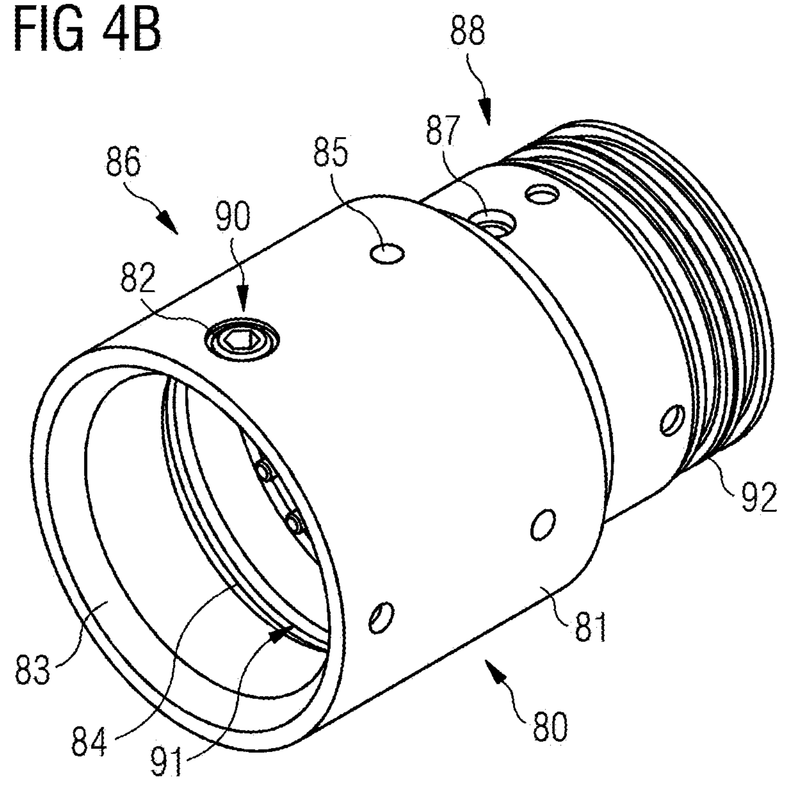
FIG. 4*b* illustrates a universal interface receptacle according to the present invention.

The present invention aims to reduce costs and stocking levels, as well as simplifying the supply chain. This problem is addressed by amalgamating all the required features into a single body which can be used by any mate type. As can be better understood from the description hereinafter, a universal interface body for plug and receptacle, having a single front end for all mate types and the same housing body form, or metalwork, is provided. This universal interface may then be customised by adding features to the standard body, if required. This is illustrated in the examples of FIGS. 4*a* and 4*b*. A standard plug front end according to the invention is illustrated in FIG. 4*a*. The plug 70 comprises a coarse alignment feature in the form of a bullnose 71. The bullnose comprises a series of three truncated cones, the first and third of the cones comprising substantially congruent faces 120, 122, the first and second cones being joined at their maximum diameter 124 and the second and third cones being joined at their minimum diameter 123. In addition to the bullnose 71 in a front section 72 of the plug body 75, there is a mount key locator 74 in a rear section 73 of the plug body. The bullnose 71 tapers to a front surface 76 of the plug front end 72 and to a groove 77 behind the bullnose. The bullnose provides coarse alignment as the plug is inserted into the receptacle. Fine alignment may be provided by a keyway 78, formed in an outer surface of the plug body 75. One or more water ports 79 are provided in the body, towards the rear end 73 of the body. FIG. 4*b* illustrates the corresponding receptacle 80 in which a receptacle body 81 comprises a front section 86 and a rear section 88. In the front section, a lead-in chamfer 83 on the inner surface at the front face is provided to guide the plug front end. Further into the receptacle body 81, a snap ring groove 84 is formed and, where required e.g. for ROV and diver mates, a snap ring 91 is mounted in the groove, to latch with a groove behind the bullnose of the plug when the plug is inserted. An opening 90 is formed in the receptacle front section 86 through which a key 82 may be inserted to cooperate with the keyway 78 of the plug, during mating. Toward the rear of the front section 86 of the receptacle body 81, water ports are provided to allow water to be forced out by the movement of the plug 70 into the receptacle, during mating. In the rear section 88 of the receptacle, mount key positions 87 are formed to allow a suitable mount to be attached, according to the application, i.e. ROV, stab or diver type mate.

Thus, the design provides a standardised plug front end 70 and receptacle front end 80, which are adapted to be configured to the different mate types. The single plug and receptacle bodies incorporate the features needed by any of the mate types, rather than the conventional arrangement of having type specific bodies with only type specific features. The bullnose feature 71, previously only used for an ROV mate is provided as standard for all three connector types as is the fitting for a latch, previously not used for a stab mate. A key and keyway, as well as a mount location towards the rear end of each of the plug and receptacle bodies are provided as standard. For the stab mate, the latch would not be fitted, during assembly, as it is not needed, although the standardised housing is able to take a latch. This avoids unnecessary increases in the part count for the stab mate. Grooves, opening and screws are all put in the same specific places for all mate types. The diameters of various parts of the bodies may be standardised, rather than there being diver, stab and ROV specific body diameters. Although some aspects of the manufacturing may appear to increase costs, the standardisation allows economies of scale that were not possible with the type specific bodies, leading to an overall cost reduction across all the mate types.

The connectors typically comprise a corrosion resistant alloy, suitable for subsea applications, such as stainless steel, super duplex or titanium. Titanium is the most expensive of these. Super duplex has greater mechanical strength than stainless steel, so wall thickness can be reduced relative to a stainless connector or plastics. Typically, the alloy is machined to the desired shape, as the components have tight tolerances, which can be achieved by machining without the need for secondary steps, with their associated delay and cost. Methods such as casting require secondary operations to bring the parts to the required specification, which adds costs to the manufacturing process that are only recovered in high volume products. Production of subsea suitable components is relatively low volume compared to engineering products in general.

For both plug and receptacle, the backend may also be standardised. As illustrated in FIGS. 4*a* and 4*b*, seals 89 are provided on the plug back end and seals 92 on the receptacle back end. These seals may, for example, be seals with sufficiently thick walls to take full differential pressure. The mount keys allow a mount to be fitted if needed between the body and seals of the plug or the receptacle. Conventionally, the different mate types had different flanges, with different types of seals, different shapes of flange and different interfaces. The standardised body allows the flanges of whichever type to be joined on using the same connection locators, i.e. the mount keys 74, 87 and it is no longer necessary to machine an integral flange into the body for the case where a bulkhead mounting is used. Where a compliant mount was used, conventionally the mount was fitted one way for a plug and the opposite way for a receptacle, with markings, but this could result in errors in fitting. Now the mounts themselves are standardised, it is possible to always fit these the same way around, so this reduces errors in assembly. Conventionally, for bulkhead mounted connectors, the backshell has been sealed to the plug or receptacle using a face seal and a barrel seal, but it is now possible to have two barrel seals to deal with full differential pressure, or only a single seal if full differential pressure is not an issue.

Figure 5A:
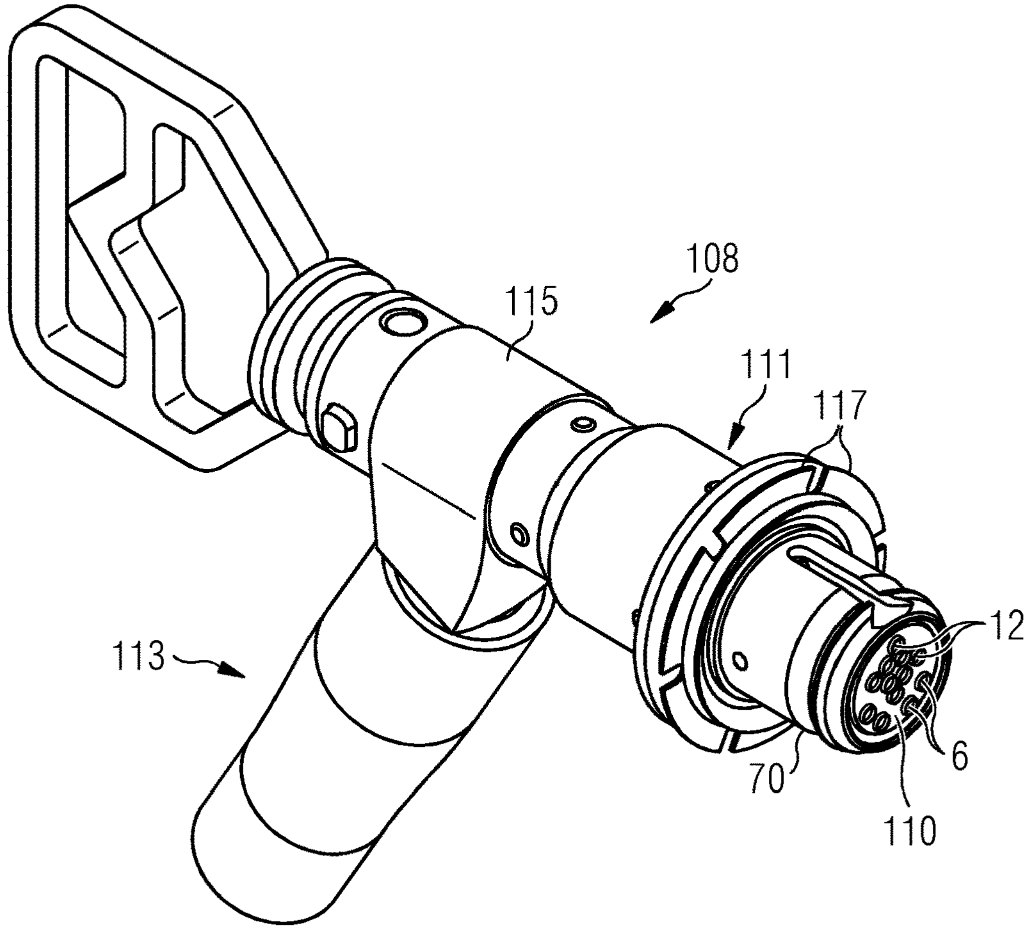
FIG. 5*a* illustrates an ROV mate plug including a universal interface according to the present invention.
Figure 5B:
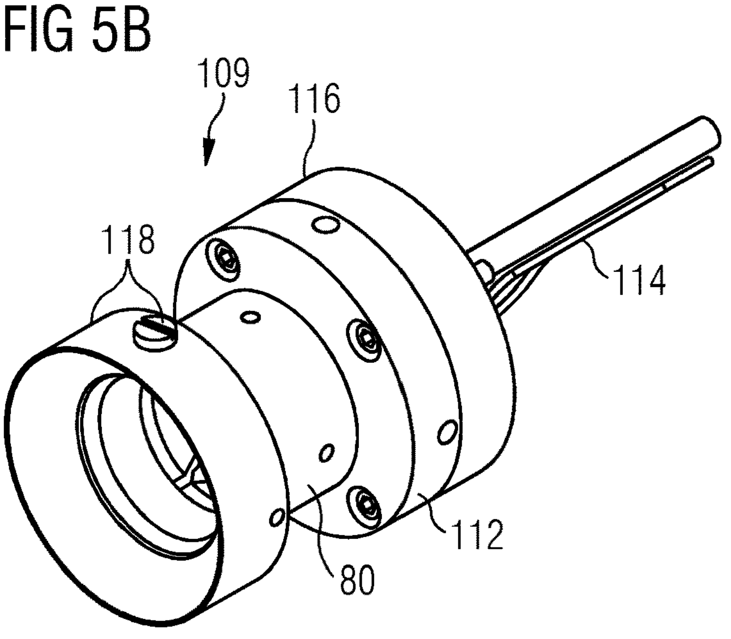
FIG. 5*b* illustrates a receptacle corresponding to the plug of FIG. 5*a*; and, FIG. 6 is a flow diagram illustrating the steps in mating or demating the plug and receptacle of FIGS. 4*a* and 4*b*.

FIGS. 5*a* and 5*b* illustrate an example of an ROV flying plug connector 108 and ROV bulkhead receptacle connector 109 more fully, setting the plug and receptacle housings 70, 80 of the present invention in context. An ROV handle connects into an ROV flying backend assembly 115 which receives a cable or hose 113 connected to an optional mount section 111 with ROV plug ancillaries 117 and through a plug body 110 in the plug front end housing 70 having data and power contacts 12, 6 to receive corresponding data and power pins from a receptacle. Alternatively, the backend 115 and front end housing body 110 may be connected directly, without the optional mount section, for example, if there are no ancillaries to add, or if those ancillaries can be mounted directly to the front end housing body. This further reduces the part count and manufacturing steps, reducing cost. The corresponding ROV bulkhead receptacle connector 80 includes ROV receptacle ancillaries 118 in a front section and bulkhead back end 116 behind the mounting section 112. Conductors from a cable termination 114 into the back end 116 connect with conductor pins in the receptacle body (not shown). When mated the receptacle pins and plug contacts are in electrical contact.

Figure 6:
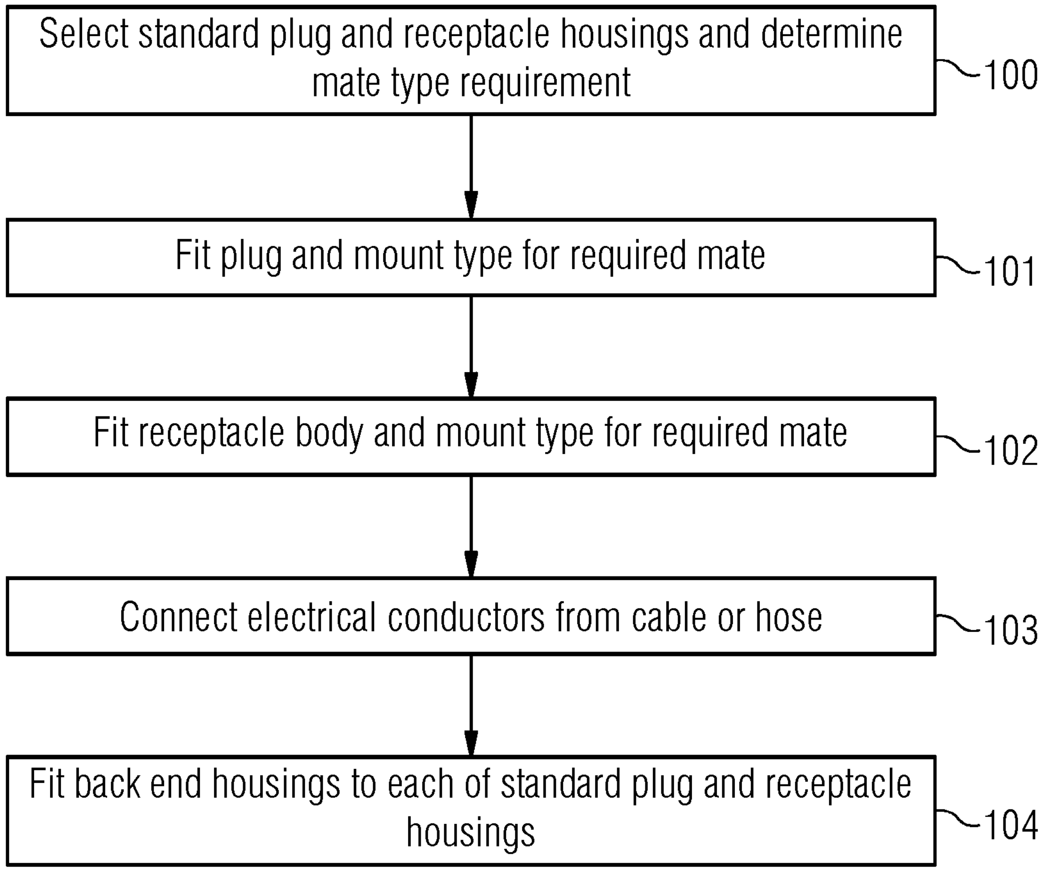

FIG. 6 illustrates a method of assembling a wet mate connector using the standardised plug and receptacle housings of the present invention. In a first step, the desired mating type, e.g. ROV, diver, or stab mate is determined and standard plug and receptacle housings 70, 80 are selected 100 from stock. A plug body 110 and the appropriate mount 111 for the chosen mate type are fitted 101 to the plug housing. A receptacle body (not shown) and the appropriate mount (112) for the chosen mate type are fitted 102 to the receptacle housing, for example using screws, bolts or pins in the through holes 87. In some of the mounting plates, feature 74 is used to orientate the connector in the mount. To the rear of this hole are grub screw holes, typically blind holes, in this example four grub screw holes. Backshells etc may be fixed to the body using grub screws, whereas often the mount is captivated between the backshell and the raised portion of the connector forward of orientation hole 74. Electrical conductors in a hose or cable (113, 114) are connected 103 to the back of each of the plug and receptacle bodies and back end housings (115, 116) are fitted 104 to the seals 89, 92 in the seal sections of each of the plug housing and receptacle housing.

By providing a universal interface, and combining the features of ROV, stab plate, and diver mated connectors into one connector housing, components can be purchased in significantly larger quantities than before. By purchasing larger part quantities, price breaks can be met, and the overall connector cost is reduced. By offering a standard interface for the connector bodywork, changes can be accommodated more easily and the impact on lead times can be reduced. A single change to the bodywork, no longer requires updates to multiple assemblies, drawings and associated documentation.

A further simplification is to choose the connector size to house a maximum number of contacts, typically 12 contacts, rather than having series variants of different sizes, such as smaller bodies for 4way, or 7way, than for 12way options. Only as many contacts as are required in the application are used, but each housing can accommodate a body of a size suitable for the maximum number of contacts. Ancillary components may be chosen to fit to the standard bodies, such as latch indicators or ROV cones and flying backshells for ROV Connectors, or stab mounting plates for STAB connectors, enabling the body to be configured in the same way as in any of the existing connector types. By reducing the number of front end assemblies to the minimum required, larger quantities of the connector body metalwork can be stocked, which reduces per item material cost. Reducing variation and standardizing the front ends across the product range, reduces lead times by streamlining processes and optimizing jigs and fixtures.

While the present invention has been described above by reference to various embodiments, it should be understood that many changes and modifications can be made to the described embodiments. It is therefore intended that the foregoing description be regarded as illustrative rather than limiting, and that it be understood that all equivalents and/or combinations of embodiments are intended to be included in this description.

The foregoing examples have been provided merely for the purpose of explanation and are in no way to be construed as limiting of the present invention disclosed herein. While the invention has been described with reference to various embodiments, it is understood that the words, which have been used herein, are words of description and illustration, rather than words of limitation. Further, although the invention has been described herein with reference to particular means, materials, and embodiments, the invention is not intended to be limited to the particulars disclosed herein; rather, the invention extends to all functionally equivalent structures, methods and uses, such as are within the scope of the appended claims. Those skilled in the art, having the benefit of the teachings of this specification, may affect numerous modifications thereto and changes may be made without departing from the scope of the invention in its aspects.

It should be noted that the term "comprising" does not exclude other elements or steps and "a" or "an" does not exclude a plurality. Elements described in association with different embodiments may be combined. It should also be noted that reference signs in the claims should not be construed as limiting the scope of the claims. Although the invention is illustrated and described in detail by the preferred embodiments, the invention is not limited by the examples disclosed, and other variations can be derived therefrom by a person skilled in the art without departing from the scope of the invention.

The invention claimed is:

1. A plug front end housing for a Remotely Operated Vehicle (ROV), diver, or stab, wet mateable connector, the plug front end housing comprising:
- a plug housing front section;
- a locator mount section; and
- a seal section axially in series with one another;
- wherein the plug housing front section comprises a plug coarse alignment feature on an outer surface of the plug housing front section, adjacent to a front surface of the plug housing front section and radially outward of a central axis of the plug front end housing; a circumferential groove on the outer surface of the plug housing front section, axially displaced from and rearward of the plug coarse alignment feature; wherein the plug coarse alignment feature comprises a bullnose feature;
- wherein the circumferential groove is adapted to receive a latch of an ROV, or diver, wet-mateable connector receptacle front end housing; and
- wherein a plug fine alignment feature is formed in the outer surface of the plug housing front section, aligned with and located radially outward of the central axis of the plug front end housing; and wherein the plug coarse alignment feature comprises a series of three truncated cones, the first and third of the cones comprising substantially congruent faces, the first and second cones being joined at their maximum diameter and the second and third cones being joined at their minimum diameter.

2. The plug front end housing according to claim 1, wherein the plug fine alignment feature comprises a longitudinal groove forming a keyway.

3. The plug front end housing according to claim 1, wherein the plug housing front section comprises one or more fluid outlets, toward a rear end of the plug housing front section.

4. A receptacle front end housing for a Remotely Operated Vehicle (ROV), diver or stab, wet mateable connector, the receptacle front end housing comprising a receptacle housing front section;

a locator mount section; and a seal section axially in series with one another;

wherein the receptacle housing front section comprises a receptacle coarse alignment feature on an inner surface of the receptacle housing front section, adjacent to a front surface of the receptacle housing front section and radially outward of a central axis of the receptacle front end housing; wherein the receptacle coarse alignment feature comprises a lead in chamfer;

a latch for an ROV or diver wet matable connector, on the inner surface of the receptacle housing front section, axially displaced from and rearward of the receptacle coarse alignment feature, the latch being adapted to cooperate with a groove of an ROV, or diver, wet matable connector, wet-mateable connector plug front end housing; and a receptacle fine alignment feature formed in the outer surface of the receptacle housing front section.

5. The receptacle front end housing according to claim 4, wherein the seal section comprises one or more barrel seals.

6. The receptacle front end housing according to claim 4, wherein the receptacle housing front section comprises one or more fluid outlets, toward the rear end of the receptacle housing front section.

7. The receptacle front end housing according to claim 4, wherein the receptacle fine alignment feature comprises a through hole.

8. The receptacle front end housing according to claim 7, wherein the receptacle fine alignment feature further comprises a key mounted in the through hole.

9. The receptacle front end housing according to claim 4, wherein the locator mount section comprises one or more blind holes, adapted to receive fasteners.

10. The receptacle front end housing according to claim 9, wherein the blind holes comprise threaded or smooth inner surfaces.

11. An ROV, diver or stab, wet mateable connector, comprising:

a plug part and a receptacle part;

the plug part comprising a plug front end housing according to claim 1; a plug front end body comprising electrical pins; a connector plug mount and a connector plug back end housing;

the plug front end housing comprising:

a plug housing front section;

a locator mount section; and a seal section axially in series with one another;

wherein the plug housing front section comprises a plug coarse alignment feature on an outer surface of the plug housing front section, adjacent to a front surface of the plug housing front section and radially outward of a central axis of the plug front end housing; a circumferential groove on the outer surface of the plug housing front section, axially displaced from and rearward of the plug coarse alignment feature; wherein the plug coarse alignment feature comprises a bullnose feature;

wherein the circumferential groove is adapted to receive a latch of an ROY, or diver, wet-mateable connector receptacle front end housing;

wherein a plug fine alignment feature is formed in the outer surface of the plug housing front section, aligned with and located radially outward of the central axis of the plug front end housing;

the receptacle part comprising a receptacle front end housing, a receptacle front end body comprising electrical contacts; a connector receptacle mount and a connector receptacle back end housing;

wherein the receptacle front end housing comprises a receptacle housing front section; a locator mount section; and a seal section axially in series with one another; wherein the receptacle housing front section comprises a receptacle coarse alignment feature on an inner surface of the receptacle housing front section, adjacent to a front surface of the receptacle housing front section and radially outward of a central axis of the receptacle front end housing; wherein the receptacle coarse alignment feature comprises a lead in chamfer; a latch for an ROV or diver wet matable connector, on the inner surface of the receptacle housing front section, axially displaced from and rearward of the receptacle coarse alignment feature, the latch being adapted to cooperate with a groove of an ROV, or diver, wet matable connector, wet-mateable connector plug front end housing; and a receptacle fine alignment feature formed in the outer surface of the receptacle housing front section.

* * * * *